May 3, 1966 H. E. RUEHLEMANN 3,249,905

STRIP CONTACT

Filed Aug. 9, 1963 2 Sheets-Sheet 1

INVENTOR.
HERBERT E. RUEHLEMANN
BY
Caesar and Rivise
ATTORNEYS.

May 3, 1966 H. E. RUEHLEMANN 3,249,905

STRIP CONTACT

Filed Aug. 9, 1963

2 Sheets-Sheet 2

INVENTOR.
HERBERT E. RUEHLEMANN
BY
Caesar and Rivise
ATTORNEYS.

United States Patent Office 3,249,905

Patented May 3, 1966

3,249,905

STRIP CONTACT

Herbert E. Ruehlemann, Huntingdon Valley, Pa., assignor to Elco Corporation, Willow Grove, Pa., a corporation of Pennsylvania Filed Aug. 9, 1963, Ser. No. 301,075
4 Claims. (Cl. 339—18)

This invention relates to a strip contact and has as its objective the provision of a new and improved device of this general class.

It is known to secure a large number of contacts to a framework in rows in accordance with a pre-conceived arrangement. Such contacts are designed to receive the edge of a printed circuit board and make electrical and mechanical connection with at least one conductive member of the printed circuited board. Furthermore, it is necessary to supply the printed circuit board with certain voltages and also with ground. In order to do this connectors have been provided carrying a large number of contacts in lengthy spaced rows. Contacts of this nature have been referred to as "bus" contacts.

The tails of the bus contacts heretofore used have been fashioned in a V shape to facilitate the joining of large numbers of the bus contacts in a series relationship. This is done by securing a continuous wire within the V of each contact and then soldering the same to the tails of the respective contacts. The foregoing soldering operation is not only time consuming but also it has been found that a solder connection may not be reliable.

It is therefore a prime objective of the present invention to provide bus contacts in such a form that they need not be soldered together for electrical purposes.

A further object of the present invention is to provide bus contacts in an extremely versatile form.

Yet another object of the present invention is to effect a substantial economy by producing bus contacts which may be used in a most economical manner.

The foregoing as well as other objects of the invention are achieved by providing the bus contacts as an integral part of an endless strip.

The prime embodiment of this invention presents the endless strips in such a manner that the plane of each bus contact lies perpendicularly with respect to the plane of the endless strip. The contacts of the present invention are manufactured in accordance with well known stamping, bending and turning techniques in order to provide the unique contact and connector of the present invention.

Another feature of the present invention is the provision of a locking lance with each contact in order to lock the contact in place in a complementary opening of a support casting.

A further feature of the present invention is the provision of various rows of bus contacts wherein one row runs perpendicularly to a second row and bridges the same in order to maintain independent circuitry.

Yet a further feature of the present invention is the provision of closely spaced rows of bus contacts whereby a particular voltage or ground for the printed circuit board circuitry may be obtained by merely plugging in to a desired row of bus contacts.

Still another feature of the present invention is the location of the bus contacts in the interior of an insulator with the outer edges of the endless strip being flush with the rear of the insulator. Internal bussing can even the achieved by sandwiching the endless strips of the present invention between two insulators.

Other objects and many of the attendant advantages of the present invention will be readily appreciated as the same becomes better understood by reference to the following detailed description when considered in connection with the accompanying drawings wherein.

Figures 1, 2, 3, 4, 9:
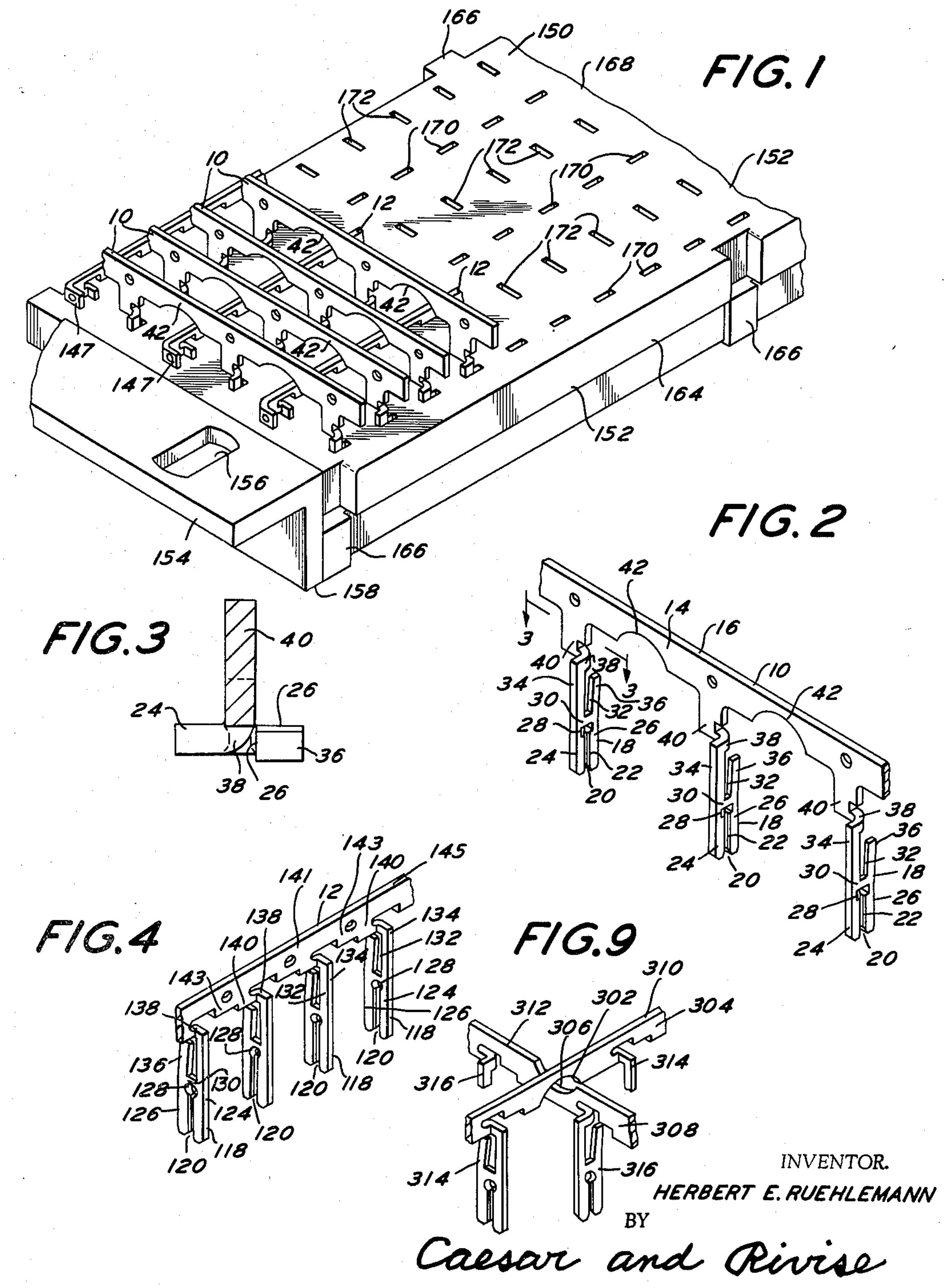
FIG. 1 is a fragmentary perspective view taken generally from the bottom of a connector assembly securing a series of perpendicular rows of strip contacts of the present invention, the rows of contacts running in one direction being identified as longitudinal strip contacts and the rows of contacts running in a direction perpendicular thereto being identified as bridging strip contacts.
FIG. 2 is a fragmentary enlarged perspective view of a portion of a strip contact which is known as the bridging strip contact.
FIG. 3 is an enlarged sectional view taken along the lines 3—3 of FIG. 2.
FIG. 4 is a fragmentary enlarged perspective view of a section of strip contact known as the longitudinal strip contact.
FIG. 9 is a fragmentary perspective view of a modified detail of the contacts used in the connector of FIG. 1 wherein the upper edges of the perpendicular strip contacts are essentially at the same level.

Referring now to the various figures of the drawing wherein like reference numerals refer to like parts, there is shown in FIGS. 2, 3 and 4 strip contacts embodying the present invention. FIGS. 2 and 3 show bridging contact strip 10 and FIG. 4 shows longitudinal contact strip 12. These names are derived from the placing of the contact strips in an insulating block to form the connector assembly illustrated in FIG. 1. Returning to FIG. 2, the bridging strip contact 10 basically comprises an endless strip 14 having a generally flat upper edge 16. Contacts 18 depend downwardly from the lower edge of the bridging strip contact 10 but are preferably integral with endless strip 14 and in a plane perpendicular thereto.

Each contact 18 includes a contact head 20 that is preferably bifurcated and which is generally of the construction disclosed in Fox United States Patent No. 2,828,474. The contacts 18 are essentially flat and are constructed of a spring-hard Phosphor Bronze, copper or other suitable electrically conductive material having the necessary balance of resiliency and strength required herein.

The contact head or mating section 20 is bifurcated by virtue of a slot 22 along the longitudinal center thereof to provide a pair of contact legs 24 and 26 which are spaced from each other by virtue of the slot 22. The outer edges of the contact legs 24 and 26 are generally parallel to each other, the front edges thereof eventually tapering backwardly towards each other until meeting the slot 22.

The inner edges of the contact head 20 are chamfered to present substantially flat contact surfaces. In mating position a contact with a contact head similarly constructed will mate perpendicularly with respect to the contact head 18 in accordance with the description in Fox United States Patents No. 2,828,474 and No. 2,994,506. When this is done the chamfered surfaces of the contact heads are in engagement with each other to provide a large area of electrical contact. The distance between the inner edges of the contact legs 24 and 26 is slightly less than the thickness of the contact so that when a complementary contact is engaged in slot 22 the contact legs 24 and 26 are slightly forced apart to engage the mating contact under tension. As further shown in FIG. 2, the tension may be enhanced by the provision of an enlarged opening 28 at the base or rear end of the slot 22. Immediately behind the enlarged opening 28 is a bridging section 30 which separates opening 28 from rear slot 32 which in part defines connecting arm 34 and locking lance 36.

When a contact with a contact head similarly constructed to contact head 20 is brought into perpendicular mating relationship with contact head 20, the respective contact legs 24 and 26 of contact 18 are spread apart slightly, by reason of their spacing a distance slightly less than the thickness of the mating contact, to permit a smooth sliding action between the respective pairs of contact legs while still providing adequate tension to insure good electrical contact.

It is to be understood that other types of bifurcated mating sections may be employed and, also, the mating sections may be male, female or other types known in the art so long as satisfactory mating can occur at the contact head 20.

As revealed in FIG. 3, the locking lance 36 is slightly inclined away from the plane of the remainder of the contact 18. This is to enable the entire contact 18 to be snapped in place in an opening in an insulating block such as that shown in FIG. 1. As the contact 18 is inserted into one of the complementary elongated openings of the insulating block, the locking lance 36 is momentarily urged to lie in essentially the same plane as the remainder of the contact because of the confining nature of the opening in the insulating block. However, when the contact has been inserted to a point somewhat below the surface of the insulating block the lance 36 may communicate with an internal cavity specially provided for this purpose. When this happens the lance 36 snaps to its original position and the contact is accordingly locked within the complementary elongated opening in the insulating block.

The connecting arm 34 of contact 18 is formed through stamping and bending operations and extends upwardly toward endless strip 14 (FIG. 2). It then merges at its topmost point with an arcuate integral lug 38 which serves to connect the contact 18 to the endless strip 14. The other end of the arcuate lug 38 then meets tab 40 which depends from the endless strip 14. Each of the tabs 40 are regularly spaced along the endless strip 14 as illustrated in FIG. 2. Of course, such spacing can be designed in accordance with the requirements of the complementary openings in an insulating block into which the contacts 18 are to be inserted. FIG. 2 further shows that arches 42 are formed in the endless strip 14 intermediate a pair of tabs 40 and also intermediate a pair of contacts 18. The arches 42 serve the function of permitting a perpendicular longitudinal strip contact 12 to pass beneath the bridging strip contacts 10 in a manner as indicated in FIG. 1.

In checking FIG. 2 it is to be noted that the bridging strip contact 10 is so constructed that the plane of each of the contacts 18 is generally perpendicular to the plane of the endless strip 14. While this is a preferred feature of the invention, the contacts 18 may in certain instances be angularly related to the contact strip 14, such as, at an acute angle, or in the same plane as the endless strip 14, or in a plane parallel thereto.

The longitudinal strip contact 12 is generally constructed along the lines of the bridging strip contact 10 with, however, several modifications. However, the contacts 118 of the longitudinal strip contact 12 are substantially identical with the contacts 18 of the bridging strip contact 10. Thus the contacts 118 are bifurcated by virtue of slots 120 and possess contact legs 124 and 126 and an enelarged opening 128 at the base of slot 120. The contacts 118 further possess a bridging section 130, a connecting arm 134 and a locking lance 136 which is inclined slightly from the plane of the contact 118 in the same manner as the locking lance 36 is inclined from the plane of the contact 18. The connecting arm 134 merges into an arcuate lug 138 which extends from a lower tab 140 depending from endless strip 141. The lower tab 140 merges into an upper tab 143 which also depends from the endless strip 141, the strip 141 having a generally flat upper edge 145. Where desired the extreme end of the endless strip 143 may terminate in an arcuate finger 147 as shown in FIG. 1.

It is to be noted that the plane of the contacts 118 preferably lies perpendicularly to the plane of the endless strip 141. As with contact 18, the plane of the contacts 118 may be located angularly with respect to the endless strip 141, such as, at an acute angle, or the contacts 118 may lie in the same plane as that of the endless strip 141 or they may lie in a plane parallel thereto.

Figure 5:
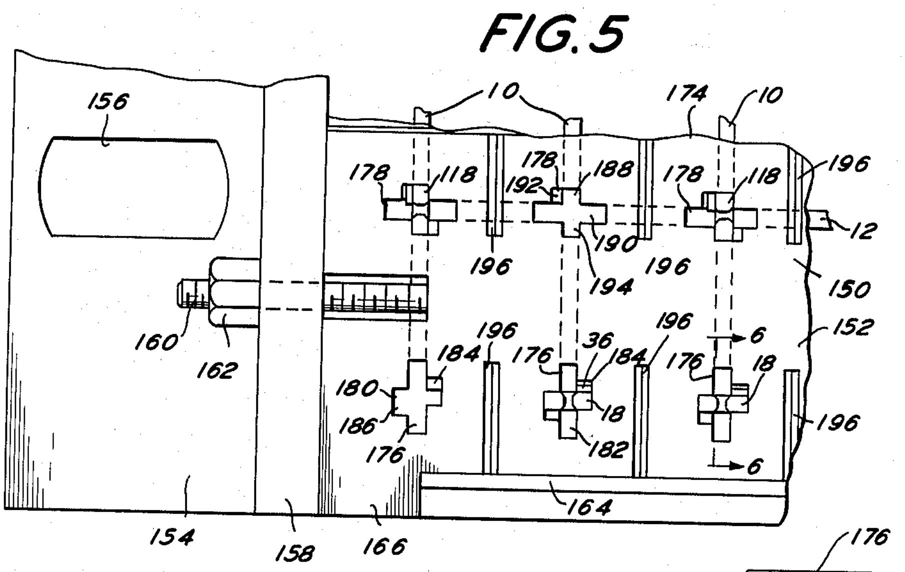
FIG. 5 is an enlarged fragmentary top plan view of the connector assembly of FIG. 1.
Figure 6:
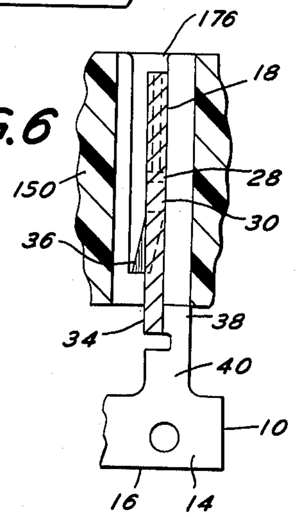
FIG. 6 is an enlarged sectional view taken along the lines 6—6 of FIG. 5.

As illustrated in FIGS. 1, 5 and 6, the bridging strip contacts 10 and the longitudinal strip contacts 12 may be located in an insulating block 150.

The insulating block 150 is shown generally from the bottom thereof in FIG. 1 and a top plan view of a portion of the insulating block 150 is shown in FIG. 5. As clearly shown in FIG. 1, the insulating block 150 basically comprises a body section 152 with openings to receive the strip contacts 10 and 12. The insulating block 150 also includes end flanges 154 having openings 156 formed therein. The flange 154 extends from an end wall 158 defining the body section 152. The end wall 158 may have openings formed therein to permit the passage of bolts 160 (FIG. 5) with lock nut 162. As further shown in FIG. 5, the insulating block 150 and particularly the body section 152 include protruding elongated ledges 164 which alternate with short protruding ledges 166. The bulk of the body section 152, however, is devoted to providing areas for the reception of the bridging strip contacts 10 and the longitudinal strip contacts 12.

In this connection attention is respectfully referred to FIG. 1 which generally shows the bottom face 168 of the body section 152. The bottom face 168 possesses a series of longitudinally elongated openings 170 and laterally elongated openings 172.

The openings 170 receive the contacts 18 of the bridging strip contact 10 and the openings 172 receive the contacts 118 of the longitudinal strip contact 12. As shown in FIG. 1, the openings 170 are disposed in parallel rows which alternate with parallel rows of openings 172. As further shown in FIG. 1, the longitudinal strip contacts 12 run longitudinally across the insulating block 150 while the bridging strip contacts 10 run laterally across the insulating block 150 and also cross over but do not touch the longitudinal strip contacts 12. This is achieved by the provision of the arches 42 formed in the endless strips 14 of the bridging strip contacts 10.

Attention is now referred to the front face 174 of the insulating block 150 as illustrated in the top plan view of FIG. 5. As shown in FIG. 5, the front face 174 has a plurality of openings formed therein which are actually extensions of the openings 170 and 172 extending from the rear face 168 as illustrated in FIG. 1. Thus, the front face 174 has a row of bridging strip contact openings 176 followed by a row of longitudinal strip contact openings 178. The bridging strip openings 176 in front face 174 communicate with the longitudinally elongated openings 170 in bottom face 168; and the longitudinal strip contact openings 178 communicate with the laterally elongated openings 172 in the bottom face 168.

The openings 176 and 178 continue in alternating rows in the same manner as the openings 170 and 172 are present in alternating rows.

It is to be noted that both the openings 176 and 178 are generally in the form of a cross. FIG. 5 shows an opening 176 and an opening 178 as they look without the introduction of a contact. Other openings 176 and 178 are shown with inserted contacts. The form of openings 176 and 178 permits the seating of a contact 18 or 118 from the strip contacts of the present invention and further accommodates the perpendicular mating of a complementary contact as discussed previously.

Thus, the opening 176 is in part comprised of a longitudinally elongated area 180 which essentially coincides with the opening 170 in the bottom face 168. As will be apparent from a comparison of the openings 170 and 180 in the light of FIGS. 1 and 5, the contact 18 extends through the opening 170 and the mating heads thereof can be seen as located in the area 180 in FIG. 5. The opening 176 further includes a lateral area 182 which as shown in FIG. 5 is unoccupied. The purpose of the area 182 is to receive a contact which will mate with the contact 18 in perpendicular relationship.

While the opening 176 is generally in the form of a cross, it is not in the shape of a true cross because of the additional small areas 184 and 186. The area 184 defines the chamber which receives the locking lance 36 of the contact 18 in order to lock the contact 18 in the contact cavity defined by the openings 170 and 176. The other area 186 is for reception also of a locking lance where the contact 18 has been reversed.

As previously discussed the opening 178 is also generally in the form of a cross and possesses a lateral area 188 which receives the contact 118 in a manner similar to the discussion of the corresponding area in opening 176. The area 188 communicates with the laterally elongated opening 172 in the bottom face 168.

The opening 178 further includes an elongated longitudinal area 190 in order to receive a mating contact. The opening 178 also includes areas 192 and 194 for reception of the locking lance as previously discussed.

Finally, the front face 174 includes measuring or spacing slits 196 which are directly formed in the molding process of making the insulating block 150.

A further inspection of FIG. 5 reveals that the contacts 118 extend longitudinally from longitudinal strip contacts 12 with the planes of the contact 118 being perpendicular to the plane of the longitudinal strip contact 12.

The bridging strip contacts 10 extend laterally with contacts 18 thereof extending perpendicular thereto or in a longitudinal direction. While the arch 42 of the bridging strip contact 10 is not visible in FIG. 5 since it is adjacent the rear face, it can be appreciated that the bridging strip contact 10 crosses over the longitudinal strip contact 12 to maintain independence of the circuitry.

Figure 8:
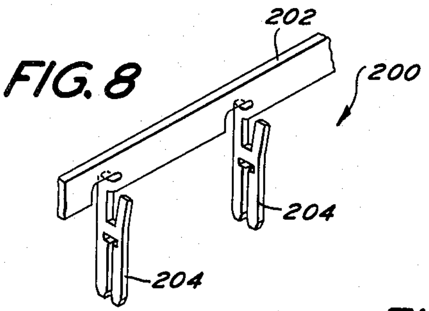
FIG. 8 is a fragmentary perspective view of the strip contacts employed in the connector of FIG. 7.
Figure 7:
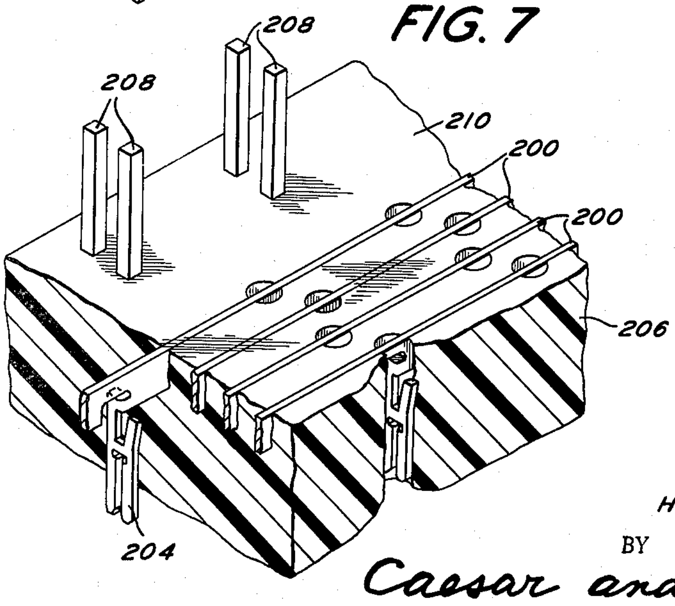
FIG. 7 is a fragmentary perspective view of another embodiment of the present invention using a series of closely spaced flush mounted parallel rows of strip contacts embodying the present invention.

Attention is now referred to FIGS. 7 and 8 which show another use of the strip contacts of the present invention. A strip contact 200 is illustrated in FIG. 8 and is generally constructed along the lines of the strip contact shown in FIG. 4. The strip contact 200 of FIG. 8 includes an endless strip 202 from which contacts 204 depend in a plane perpendicular to the plane of the endless strip 202. The contacts 204 are of a construction essentially the same as the contacts 18 and 118.

The use of the strip contact 200 is illustrated in FIG. 7 which shows a printed circuit board 206 having contacts secured thereto, the tails 208 of the contacts being visible in FIG. 7. The rear face of the printed circuit board 206 has four elongated slots formed therein and also complementary contact chambers in order to receive in a flush four strip contacts 200 as illustrated in FIG. 7. The contact chambers also have provision to receive the locking lances of the contacts 204 and are thereafter sealed as generally shown in FIG. 7. Each of the strip contacts 200 may carry a different voltage or ground. Thus, depending upon the particular needs, complementary contacts may mate with or be plugged into the contacts of a particular strip 200 in order to obtain a desired voltage in other circuitry.

Attention is now referred to FIG. 9 which shows a slight modification of strip contacts 10 and 12. In this embodiment of the invention the upper edges of both strip contacts are essentially at the same level. This is achieved by providing an arch 302 in the lower edge of the strip contacts 304 and by providing an arch 306 in the upper edge of the other strip contact 308. Thus, the upper edge 310 of strip contact 304 is essentially at the same level as the upper edge 312 of the contact 308. The arches 302 and 306 are of course repeated respectively in spaced relationship along the length of each of the strip contacts. Also, the contacts 314 and 316 are of a construction substantially the same as the contacts 18.

It is thus seen that in all of the embodiments of the invention the strip contacts are in respective separate circuits and there is no need to solder the same together into respective circuits as has been previously done. The strip contacts are easily inserted in complementary openings and are locked in place by means of the respective locking lances.

Obviously many modifications and variations of the present invention are possible in the light of the above teachings. It is, therefore, to be understood that within the scope of the appended claims, the invention may be practiced otherwise than as specifically described.

What is claimed as the invention is:

1. A connector member comprising an insulating block, at least one strip contact seated therein in a first direction and at least one strip contact seated therein perpendicular to said first named contact, said strip contacts being electrically and mechanically independent of each other, said strip contacts each comprising an endless strip and a plurality of spaced contacts integral with said strip and depending therefrom into complementary openings of said insulating block, said opening being rectangularly shaped and extending perpendicular to the axis of said associated strips, said contacts each including a depending tab and a contact head which is accessible through openings in the opposing face of said block, said contact heads having a pair of legs which are spaced from each other by a longitudinally extending slot, said contacts adapted to be releasably mated with contacts having a similar head, said tabs of said strip contact seated in said first direction being shorter than said tabs of said perpendicular strip contact so that said contact heads of both said strip contacts are equally spaced from said opposing face of said block.

2. The invention of claim 1 wherein each of said contacts includes a body section having a locking lance inclined somewhat away from the plane of the contact, said locking lances adapted to lock said strip contact in said insulating block when seated therein so that said strip is mounted in said insulating block in a single operation.

3. A connector member comprising an insulating block, a first plurality of parallel spaced strip contacts, a second plurality of parallel spaced strip contacts substantially perpendicular to said first plurality, said strip contacts of said first plurality being electrically and mechanically independent of said strip contacts of said second plurality, each of said strip contacts comprising an endless strip and a plurality of spaced contacts integral with said strip and depending therefrom into openings in said insulating block, said contacts each including a contact head which is accessible through continuations of said openings in the opposing face of said block, at least one of said plurality of strip contacts each including spaced arches along one longitudinal edge of said strip intermediate each pair of said contacts so that the upper edge of said strips of said first plurality of contacts generally lie in the same plane with the strips of said second plurality of strip contacts.

4. A connector member comprising an insulating block, a first plurality of parallel spaced strip contacts, a second plurality of parallel spaced strip contacts substantially perpendicular to said first plurality, each of said strip contacats comprising an endless strip and a plurality of contacts integral with said strip and depending therefrom into openings in said insulating block, said contacts each including a contact head which is accessible through continuations of said openings in the opposing face of said block, said contacts being spaced from each other, said strip contacts of said first plurality including spaced arches formed along the lower edge of said strip intermediate each pair of said contacts and said strip contacts of said second plurality of strips including spaced arches formed along the upper edge of said strip intermediate each pair of said contacts so that the upper edges of both strips may generally lie in the same plane.

References Cited by the Examiner

UNITED STATES PATENTS

| | | | |
|---|---|---|---|
| 2,131,584 | 9/1938 | Cruser. | |
| 2,810,895 | 10/1957 | Odegaard | 339—191 X |
| 2,828,474 | 3/1958 | Fox | 339—185 |
| 2,936,407 | 5/1960 | Ewald | 317—101 X |
| 2,965,872 | 12/1960 | Linn | 339—198 X |
| 2,989,724 | 6/1961 | Woofter | 339—217 |
| 3,011,143 | 11/1961 | Dean | 339—217 X |
| 3,141,717 | 7/1964 | Olsson et al. | 339—217 X |

JOSEPH D. SEERS, *Primary Examiner.*

PATRICK A. CLIFFORD, *Examiner.*